Jan. 5, 1960  R. C. STEELE  2,919,472
METHOD OF EXPANDING EXPANDABLE
BLOCKS OF CELLULAR MATERIAL
Original Filed April 2, 1952
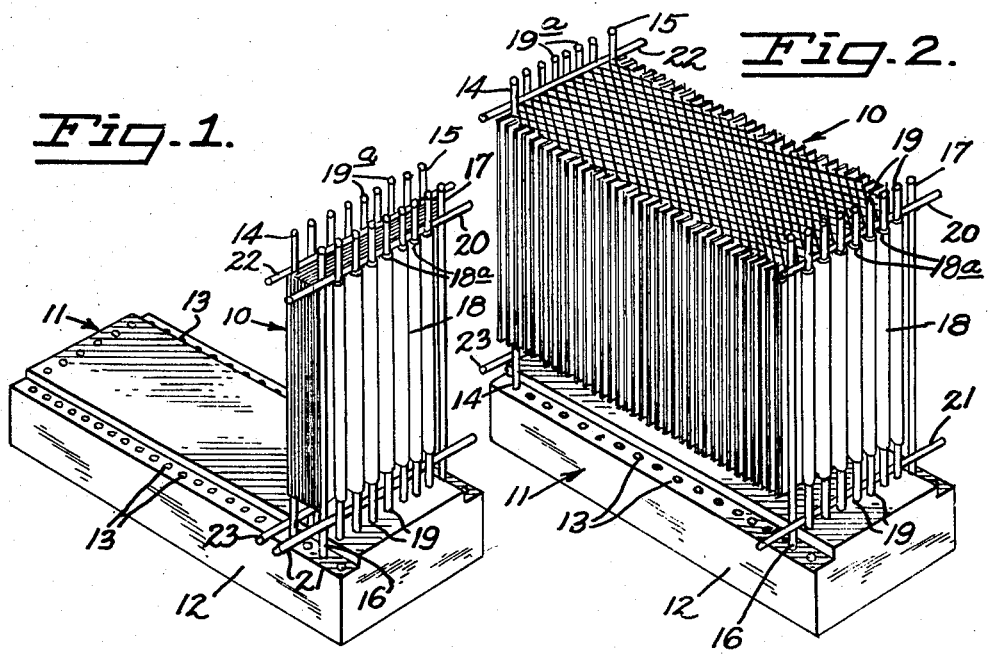
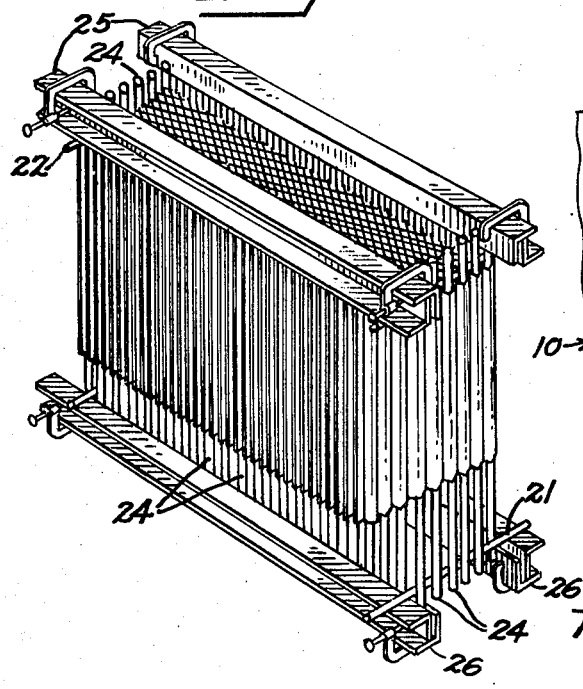
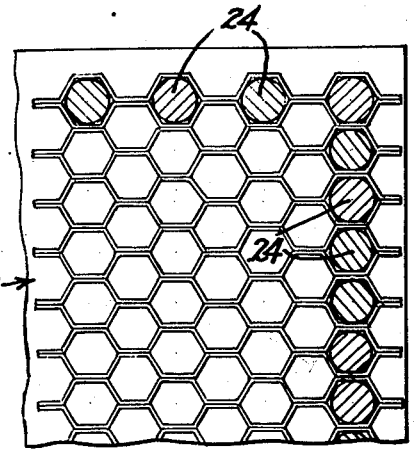
INVENTOR.
ROGER C. STEELE
BY
Townsend and Townsend
ATTORNEYS United States Patent Office 2,919,472
Patented Jan. 5, 1960

2,919,472

METHOD OF EXPANDING EXPANDABLE BLOCKS OF CELLULAR MATERIAL

Roger C. Steele, Oakland, Calif., assignor to Hexcel Products Inc., a corporation of California Continuation of application Serial No. 283,505, April 2, 1952. This application May 21, 1956, Serial No. 589,358

4 Claims. (Cl. 18—47.5)

This invention relates to a new and improved method of expanding unexpanded expandable blocks or sheets of honeycomb or generally similar cellular core material.

The present invention has particular utility and applicability in expanding certain types of honeycomb or like cellular core material made by the so-called "expansion" process, and this is a continuation of my co-pending application Serial No. 283,505, filed April 2, 1952, now abandoned. In my United States Patent No. 2,610,934 there is disclosed a method of and apparatus for fabricating honeycomb by the expansion process. In said patent it is described how honeycomb may be formed by applying alternately spaced parallel lines of adhesive to opposite sides of an elongated sheet of material and thereupon lapping said sheet of material back and forth over itself to build up a stack or block of superposed layers of said glued material, which, upon trimming off of the folded over ends, can be transversely sliced and expanded into sheets of honeycomb. Frequently, because of economic and other considerations, it is desirable to expand in one operation an entire, relatively large and thick, block of honeycomb rather than slicing the block first and thereafter expanding each individual slice thereof.

Honeycomb may be formed of a variety of materials as, for example, paper, cloth, glass cloth, and metal-foil. Honeycomb made of cloth or glass cloth almost invariably is impregnated with a suitable binding agent or compound, such as a suitable thermoplastic or thermosetting synthetic resin, for the purpose, among other things, of stiffening the material sufficiently to hold its shape and to give it strength. Kraft paper honeycomb may be resin impregnated, or not, depending on the use to which it is to be put and on economic considerations. As will appear more fully hereinafter, the present invention has particular application to the expansion of unexpanded blocks of resin impregnated paper, cloth, and/or glass cloth honeycomb, or generally similar types of cellular core material. In its broader aspects, the invention is applicable to the expansion of any type of expandable cellular material which tends to soften and become pliant upon being wet with water or other non-deleterious liquid.

It is a principal object of the invention to teach a method of expanding blocks of cellular material, which said method broadly encompasses the dousing of the block with a suitable non-deleterious liquid to cause softening of the block and render it relatively plastic during expansion thereof.

Another object is to teach a method of maintaining an expanded block of heat curable resin impregnated honeycomb core in expanded condition during the cycle of heat curing of said block, which said method comprises the steps of inserting a plurality of filler rods, each having a diameter substantially equal to the distance between opposed flats of an expanded cell of the block, through substantially all of the marginal cells of said expanded honeycomb block to establish a rectilineal rigid frame of parallel rods around the marginal edges of the expanded honeycomb block.

Another object of the present invention is to teach a method of expanding blocks of cellular material of the type hereinabove briefly referred by a process of successive zone expansion and which provides for extreme uniformity in the expanded cell size and shape of the fully expanded block.

Other objects and advantages of the present invention will become apparent upon reading the following specification and referring to the accompanying drawings in which similar characters of reference represent corresponding parts in each of the several views.

In the drawings:

Figs. 1 and 2 are perspective views of a block of honeycomb shown in different stages of expansion and shown maintained within a jig of a type which may be employed in expanding a block in accordance with the method. The cell openings of the block in Fig. 2 are schematically represented by criss-cross lines for purposes of convenient illustration.

Fig. 3 is a perspective view of a fully expanded block of honeycomb maintained with a suitable jig, the cell openings of the block being represented schematically by criss-cross lines.

Fig. 4 is an enlarged fragmentary plan view of a corner section of a block of honeycomb expanded in accordance with the method employing the use of filler rods, shown in section.

Certain general aspects and principles of the present invention may be readily understood by way of specific example in connection with the expansion of a block of honeycomb, indicated generally at 10. For purposes of convenient illustration and example it may be first assumed that the honeycomb block 10 is made of unimpregnated, medium-grade, kraft paper. Due to the inherent relative stiffness and unpliability of the kraft paper itself, it is often difficult to expand a block of honeycomb made of such material without causing some of the bonding lines to pull apart or rupture.

By dousing and wetting the paper, the same will materially soften and become pliant, thereby permitting the block to be readily physically expanded with little probability of causing a separation between the bonding lines. It is a requisite condition to the practice of this method, of course, that the bonding lines themselves be substantially water resistant so as not to dissolve or soften upon contact with the water. Most synthetic resin adhesives and rubber base cements used in commercial production of honeycomb today are water resistant in their dried and cured adhesive states, thus lending themselves very well to the practice of this method.

One preferred way of carrying out the above process is to place the block to be expanded in a jig such as the type indicated generally at 11 This device is shown as comprising a base piece 12, formed along its longitudinal edges with a plurality of oppositely disposed, equidistantly spaced, wells or recesses 13—each of the wells being adapted to maintain and support a vertical standard or rod, such as indicated at 14, 15, 16, and 17. Uniform expansion of the block may be accomplished by adhesively affixing to opposite ends of the block pursable anchor strips, such as indicated at 18. Pursable anchor strips of the character and kind designated at 18 are more fully and completely described in United States Patent No. 2,674,295. It will suffice herein to say that such anchor strips may consist of a pressure sensitive, tacky, adhesive-backed web of material provided with a plurality of loops, as indicated at 18a, into which may be inserted tug pins 19 and 19a. It is characteristic of honey comb to purse or narrow in the dimension of its width as it is expanded in the direction of its length, and hence said pursable anchor strips are exceptionally well suited for use in expanding blocks or sheets of honeycomb. After insertion of tug pins 19 in loops 18a of said anchor strips, crossbars, such as indicated at 20 and 21, may be inserted transversely between the projecting ends of pins 19 and the vertical supports 16 and 17; and, similarly, crossbars 22 and 23 may be disposed between the projecting ends of pins 19a and vertical supports 14 and 15. With the unexpanded block positioned in the jig in the above manner, initial expansion forces may be applied to the block by lifting vertical supports 14 and 15 upwardly and out of engagement from wells 13 and moving said supports in a direction away from stationary supports 16 and 17. The initial expansion of the block need be only enough to cause the cells to barely open or crack, whereby water applied to the top surface block will run or seep down through the interior passages of the block defined by the partly opened or expanded cells. More specifically, after initial expansion of the block, a stream of water may then be played over the top surface thereof, as from a hose (not shown), and as the water finds its way into the interior cell areas and wets the paper material causing it to soften, rods 14 and 15 may be simultaneously moved gradually further away from supports 16 and 17 causing the block to fully expand. The block may be maintained within the jig in its expanded condition simply by dropping supporting rods 14 and 15 into any two oppositely disposed pairs of wells 13, or, if extreme evenness in uniformity of cell expansion is required resort may be had to the use of filler rods, such as shown at 24, and to be described in more detail hereinafter. While the block is maintained in fully expanded shape, the wet paper material may be dried—the drying and resultant stiffening of the paper being sufficient in itself to maintain the block in its generally expanded shape upon its removal from the jig in which it is held during the drying process.

As above mentioned, the present method is particularly applicable to the expansion of blocks of impregnated paper, cloth, or glass cloth honeycomb. Although there are numerous types and kinds of impregnates which may be employed in the fabrication of these latter mentioned types of honeycomb, multiple-stage thermo-setting synthetic resins of one type or another are frequently used. These resins have been found to be particularly suitable in the fabrication of honeycomb for a number of reasons, one of which is that they each may be advanced through successive stages into a final cure or set. Another characteristic which adapts such resins for use in honeycomb fabrication is that, generally speaking, each exhibits certain characteristics or qualities of thermoplasticity which may be utilized to advantage in the fabrication of honeycomb by the expansion process. For example, most such resins, when advanced to their commonly referred to intermediate or "B" stage, are relatively dry and unpliable at room temperatures, but each is characterized by its tendency to thereafter materially soften and exhibit rather pronounced characteristics of thermoplasticity when subjected to heat. The temperature range in which resins will materially soften, sometimes hereinafter referred to as the "thermal-softening point," will vary as between specific types of resins. For example, phenolic, nylon-phenolic, melamine formaldehyde, and urea formaldehyde resin impregnates soften and exhibit considerable thermoplasticity at temperatures ranging from approximately 140°–160° F. and above. A polyester resin impregnate will exhibit similar softening qualities within a slightly higher temperature range approaching 180° F. and above.

Assuming that a block of cloth, glass cloth, or paper honeycomb containing one of the above types of thermosetting resin impregnates, which has been advanced to its second relatively dry and unpliable stage, is to be expanded in accordance with the method, the same steps heretofore described in connection with expansion of the unimpregnated paper honeycomb block would be performed insofar as initially positioning the block within the jig 11. More specifically, tug pins, such as heretofore indicated at 19 and 19a, would be inserted into the loops of the anchor strips 18 adhesively secured to opposite ends of the block and the entire unit positioned within the jig by means of crossbars 20—21 and 22—23 disposed between the projecting ends of the tug pins and vertical supports 14—15 and 16—17, as aforesaid. Thereupon, and either simultaneous with or after the initial physical expansion of the block has caused the cells to crack or barely open, as may be accomplished by moving rods 14 and 15 a slight distance away from rods 16 and 17, the said block may be hosed or doused with hot water or other hot liquid which is nondeleterious to the resin impregnate. The temperature of the liquid should, of course, be sufficiently high to cause the impregnate to materially soften. Thus, for example, if the resin impregnate is of the type above designated which will materially soften within a temperature range of 140°–160° F., the water or other liquid would be heated to a temperature within or above this range.

I have found that excellent results are obtained by expanding the block gradually and in stages corresponding to the extent and rate at which the impregnate softens upon being subjected to the hot liquid. The water or hot liquid may be directed over one end area of the block and this portion of the block fully expanded before the hot liquid is played over the mid-portions and opposite end portions of the block. I have also found that as soon as one portion of the block has been expanded to a desired extent, excellent uniformity in cell expansion may be attained by immediately dousing the expanded area with cold water, thus cooling the impregnate and causing it to assume its relatively non-plastic state and thereby fixing said expanded area of the block in its expanded condition.

After the block has been completely expanded I then prefer to insert filler rods 24 into each marginal cell along both sides and ends of the honeycomb block. Each rod is preferably of a diameter approximately equal to the desired distance between opposed flats of an expanded honeycomb cell so as to insure equal and uniform expansion of the block throughout its entire area. In short, filler rods 24 cooperate to establish, in effect, a rectilinear rigid frame around the marginal edges of the honeycomb block, and such arrangement of the rods effectively prevents contraction of the honeycomb either in the direction of its length or width and results in attaining excellent uniformity in cell size throughout the entire area of the block. The adhesively secured pursable anchor strips 18 may be stripped or peeled from opposite ends of the block either before or after insertion of the filler rods 24 into the marginal cells of the block. In order to maintain the rectilineal shape of the rod frame defined by rods 24 and to prevent the lines of rods from bowing inwardly or outwardly during subsequent processing of the material, I prefer to secure the lines of rods within a series of straight edge clamps or jig means, such as indicated at 25 and 26, for example. These serve to maintain the rows of rods in rectilinear formation as aforesaid.

Fig. 4 is an enlarged fragmentary plan view of a corner section of a block of honeycomb showing how filler rods 24 may be inserted within each marginal cell. As above noted, the diameter of each rod is preferably such as will fill out and fully expand the cell into which it is inserted—it further being recalled that all of the filler rods are preferably of the same diameter to insure uniform cell expansion throughout the entire block area.

With the expanded block thus secured and jigged in the manner as aforesaid, the same may be placed in a curing oven and maintained therein for such time and under such temperatures as will advance the impregnate to its final thermoset or cured stage, whereupon the impregnate becomes substantially non-plastic and infusible. Thereafter the expanded block of honeycomb may be removed from the jig and the rods 24 removed therefrom. Generally speaking, the final cure or set of the impregnate will function to substantially permanently fix and maintain the expanded length and width of the block. Thereafter, the cured, expanded block may be band-sawed or otherwise sliced into sheets of desired thickness.

Although the present invention has been described in some detail by way of illustration and example for purposes of clarity of understanding, it is understood that certain changes and modifications may be practiced within the spirit of the invention and scope of the appended claims.

I claim:

1. In a method of expanding a honeycomb block formed of resin impregnated sheets and in which the resin impregnate is of a type normally relatively unpliable at room temperatures and having a thermal-softening point above room temperatures the sequential steps comprising; providing a liquid of a type non-deleterious to the resin impregnate and having a boiling point substantially higher than the thermal-softening point of said impregnate; heating said liquid to a temperature at least as high as the thermal-softening point of said resin; then applying expansion forces to said block to cause partial opening of said cells; then selecting a first transverse zone of said block; then dousing said heated liquid throughout the partially opened cells of said first zone in sufficient volume to heat the resin and cause softening of the resin impregnate throughout the exterior and interior areas of said first zone; then while said impregnate is in said softened condition physically fully expanding the cells within said first zone; then applying to said fully expanded first zone a cooling medium to cause said softened impregnate to cool and assume a relatively unplastic condition; and then expanding in substantially the same manner and in consecutive order contiguous selected transverse zones of said block until the entire block has been fully expanded, and during expansion of said block treating separately and fully one transverse zone of said block before treating a successive transverse zone.

2. In a method of expanding a honeycomb block formed of resin impregnated sheets and in which the resin impregnate is a multiple stage type thermosetting resin which has been advanced to an intermediate, relatively dry, unpliable stage at or below room temperatures and which is characterized by its tendency to materially soften and exhibit substantial thermoplasticity within a temperature range above room temperature, and which is further characterized by its ability to be advanced to a final thermoset, realatively infusible stage, the sequential steps comprising; providing a quantity of liquid of a type non-deleterious to said impregnate and having a boiling point substantially higher than the lowest temperatures at which said impregnate materially softens; heating said liquid to a temperature at least as high as the lowest temperature at which said impregnate materially softens; applying expansion forces to said block to cause partial opening of said cells; selecting a first transverse zone of said block; then dousing said heated liquid throughout the partially opened cells of said first zone in sufficient volume to heat the resin and cause softening of the resin impregnate throughout the exterior and interior areas of said zone; then while said impregnate is in softened condition physically fully expanding the cells within said first zone; then applying to said fully expanded first zone a cooling medium to cause said impregnate to cool and assume a relatively unplastic condition; then expanding in substantially the same manner and in consecutive order contiguous selected transverse zones of said block until the entire block has been fully expanded; and during expansion of said block treating separately and fully one transverse zone of said block before treating a successive transverse zone; and then while maintaining the entire block in fully expanded condition, advancing said impregnate to its final thermoset, relatively infusible stage.

3. A method according to claim 2 and including the step of inserting a plurality of filler rods each having a diameter substantially equal to the distance between flats of an expanded cell of the block through substantially all of the marginal cells of said expanded honeycomb block prior to advancing said impregnate into its final thermoset stage.

4. In a method of jigging a section of honeycomb core in expanded condition, comprising the steps of inserting a plurality of individual filler rods, each having a diameter substantially equal to the distance between opposed flats of an expanded cell of the section, through substantially all of the outermost marginal cells of said expanded honeycomb section to establish a rectilineal frame of parallel rods around the marginal edges of the expanded honeycomb section, and securing in straight line paths the two groups of rods that respectively define the two parallel sides of the frame which extend in the direction of normal contraction of the honeycomb core to prevent inward or outward bowing of said two groups of rods.

References Cited in the file of this patent

UNITED STATES PATENTS

| | | |
|---|---|---|
| 2,572,979 | Bothe | Oct. 30, 1951 |
| 2,599,199 | Roberts | June 3, 1952 |
| 2,670,314 | Ungar | Feb. 23, 1954 |